United States Patent
Brassem (10) Patent No.: US 7,912,056 B1
(45) Date of Patent: Mar. 22, 2011

(54) DYNAMIC TRAFFIC SHAPING ADJUSTMENTS FOR DISTRIBUTED MULTICAST REPLICATION

(75) Inventor: Wayne Brassem, Brampton (CA)

(73) Assignee: Juniper Networks, Inc., Sunnyvale, CA (US)

( * ) Notice: Subject to any disclaimer, the term of this patent is extended or adjusted under 35 U.S.C. 154(b) by 973 days.

(21) Appl. No.: 11/321,078

(22) Filed: Dec. 30, 2005

(51) Int. Cl.
*H04L 12/56* (2006.01)

(52) U.S. Cl. .................. 370/390; 370/230.1; 370/420

(58) Field of Classification Search .......... 370/250, 370/390, 397, 352, 355, 230, 395.1, 468, 370/389, 393, 235, 230.1, 351, 420; 709/231; 725/111

See application file for complete search history.

(56) References Cited

U.S. PATENT DOCUMENTS

| | | | | |
|---|---|---|---|---|
| 6,097,720 | A * | 8/2000 | Araujo et al. ................. | 370/355 |
| 6,101,180 | A * | 8/2000 | Donahue et al. ............. | 370/352 |
| 6,904,054 | B1 * | 6/2005 | Baum et al. .................. | 370/467 |
| 7,012,891 | B1 * | 3/2006 | Chandran et al. ............ | 370/230 |
| 7,266,609 | B2 * | 9/2007 | Bill et al. ..................... | 709/231 |
| 7,324,554 | B1 * | 1/2008 | Ginjpalli et al. .............. | 370/468 |
| 2003/0035378 | A1 * | 2/2003 | Nguyen et al. ............... | 370/250 |
| 2003/0053458 | A1 * | 3/2003 | Okazaki ........................ | 370/390 |
| 2003/0099198 | A1 * | 5/2003 | Kiremidjian et al. ....... | 370/230.1 |
| 2003/0218979 | A1 * | 11/2003 | Storry et al. ................. | 370/230 |
| 2004/0090970 | A1 * | 5/2004 | Sanchez et al. .............. | 370/397 |
| 2005/0089036 | A1 * | 4/2005 | Lee et al. ..................... | 370/390 |
| 2006/0013139 | A1 * | 1/2006 | Koch et al. ................... | 370/236 |
| 2006/0120368 | A1 * | 6/2006 | Aboukarr et al. ............ | 370/390 |
| 2006/0120369 | A1 * | 6/2006 | Chandran et al. ............ | 370/390 |
| 2006/0182109 | A1 * | 8/2006 | Melsen et al. ................ | 370/390 |
| 2008/0049615 | A1 * | 2/2008 | Bugenhagen ............... | 370/230.1 |

* cited by examiner

*Primary Examiner* — William Trost, IV
*Assistant Examiner* — Emmanuel Maglo
(74) *Attorney, Agent, or Firm* — Harrity & Harrity, LLP (57) ABSTRACT

A network device keeps track of multicast replication that is occurring at a later link in the network. The device may then intelligently adjust traffic to various end-users based on the bandwidth that is to be allotted to each end-user and based on the bandwidth that is expected to be "created" at the later link in the network. In one exemplary implementation, a device includes logic to process network traffic that includes multicast streams by performing traffic shaping functions that are based on, for each of a number of subscribers, a bandwidth of each of the multicast streams that is being subscribed to by a subscriber and a bandwidth of unicast traffic to the subscriber.

27 Claims, 7 Drawing Sheets

| CLIENT ID | MEDIA STREAM ID |
|---|---|
| CLIENT 160-1 | CHANNEL 10 |
| CLIENT 160-2 | – |
| CLIENT 160-3 | CHANNEL 10 |
| CLIENT 160-4 | – |
| CLIENT 160-5 | CHANNELS 1, 10 |

410 → CLIENT ID column; 420 → MEDIA STREAM ID column

| CHANNEL | BANDWIDTH |
|---|---|
| CHANNEL 1 | 1.5 Mbps |
| CHANNEL 2 | 1.5 Mbps |
| CHANNEL 3 | 1.5 Mbps |
| CHANNEL 4 | 1.5 Mbps |
| CHANNEL 5 | 1.5 Mbps |
| CHANNEL 6 | 1.5 Mbps |
| CHANNEL 7 | 3.0 Mbps |
| CHANNEL 8 | 3.0 Mbps |
| CHANNEL 9 | 3.0 Mbps |
| CHANNEL 10 | 3.0 Mbps |

| CHANNEL | BANDWIDTH |
|---|---|
| CHANNEL 1 | 1.5 Mbps |
| CHANNEL 2 | 1.5 Mbps |
| CHANNEL 3 | 1.5 Mbps |
| CHANNEL 4 | 1.5 Mbps |
| CHANNEL 5 | 1.5 Mbps |
| CHANNEL 6 | 3.0 Mbps |
| CHANNEL 7 | 3.0 Mbps |
| CHANNEL 8 | 3.0 Mbps |
| CHANNEL 9 | 3.0 Mbps |
| CHANNEL 10 | 3.0 Mbps |

DYNAMIC TRAFFIC SHAPING ADJUSTMENTS FOR DISTRIBUTED MULTICAST REPLICATION

BACKGROUND OF THE INVENTION

A. Field of the Invention

The principles of the invention relate generally to network traffic shaping and, more particularly, to traffic shaping in the context of multicast replication.

B. Description of Related Art

In an increasingly networked world, digital networks are being used to deliver additional data services to end-users. End-users may receive video and audio streams over a network such as a packet-based network. IPTV (Internet Protocol Television), for instance, is a system where a digital television service is delivered to subscribing consumers using the Internet Protocol (IP) over a broadband connection.

IPTV is typically delivered as live TV using a multicasting technique. Multicast generally refers to the delivery of information to a group of destinations simultaneously. In multicasting, to conserve bandwidth, traffic should ideally be transmitted over each link of the network only once. Copies of the traffic may be created only when the links to the destinations split. In comparison with multicast, point-to-single-point delivery is called unicast. When unicast is used to deliver traffic to several recipients, a copy of the traffic is sent from the sender to each recipient. The network bandwidth savings using multicasting techniques as opposed to unicast techniques can be significant, and can become particularly important in high bandwidth applications, such as IPTV.

When multicasting IPTV traffic (or other high bandwidth traffic), in order to conserve network bandwidth, it is important to replicate the traffic at a point in the network that is as close as possible to the end-user.

SUMMARY

One aspect is directed to a device for routing data to a plurality of clients. The device includes a first data structure configured to store information representing which of a number of multicast media streams are being requested by the clients and a second data structure configured to store a bandwidth required by each of the multicast media streams. The device further includes routing logic configured to implement traffic shaping functions for a client based on an assumption that a maximum bandwidth available to the client is decreased by an amount corresponding to the multicast media streams that are being requested by the client.

Another aspect is directed to a device comprising logic to process network traffic that includes a number of multicast streams by performing traffic shaping functions that are based on, for each of a number of subscribers, a bandwidth of each of the multicast streams that is being subscribed to by a subscriber and a bandwidth of unicast traffic to the subscriber. The device also includes logic to transmit the processed network traffic to a distribution device that connects subscribers to the multicast stream and replicates multicast streams in the traffic when the subscribers are simultaneously subscribing to a same multicast stream.

Yet another aspect is directed to a method that includes receiving a message, at a Broadband Remote Access Server (BRAS), from a client device indicating that the client device would like to join a multicast stream for which replication of traffic on the multicast stream occurs at a Digital Subscriber Line Access Multiplexer (DSLAM) that connects the client to the BRAS. The method further includes looking up, at the BRAS, a bandwidth requirement of the multicast stream; and routing, by the BRAS, unicast network traffic to the client device using traffic shaping functions that shape traffic based on an assumption that a maximum available bandwidth to the client device is decreased by an amount corresponding to the multicast stream that is being requested by a client.

Still further, another aspect is directed to a device that includes logic to forward network traffic in multicast streams to a distribution device that connects subscribers to the multicast streams and replicates streams in the traffic when subscribers are simultaneously subscribing to a same stream. The device further includes a data structure to store a bandwidth required by each of the multicast streams and logic to monitor the bandwidth required by each of the multicast streams and to update the data structure when the bandwidth required by one the multicast streams changes.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device, such as a router, keeps track of multicast replication that is occurring at a later link in the network, such as, for example, at a Digital Subscriber Line Access Multiplexer (DSLAM). The router may then intelligently adjust traffic to various end-users connected to the DSLAM based on the bandwidth that is to be allotted to each end-user and based on the bandwidth that is expected to be "injected" at the DSLAM due to multicast replication occurring there.

Exemplary System Overview

Figure 1:
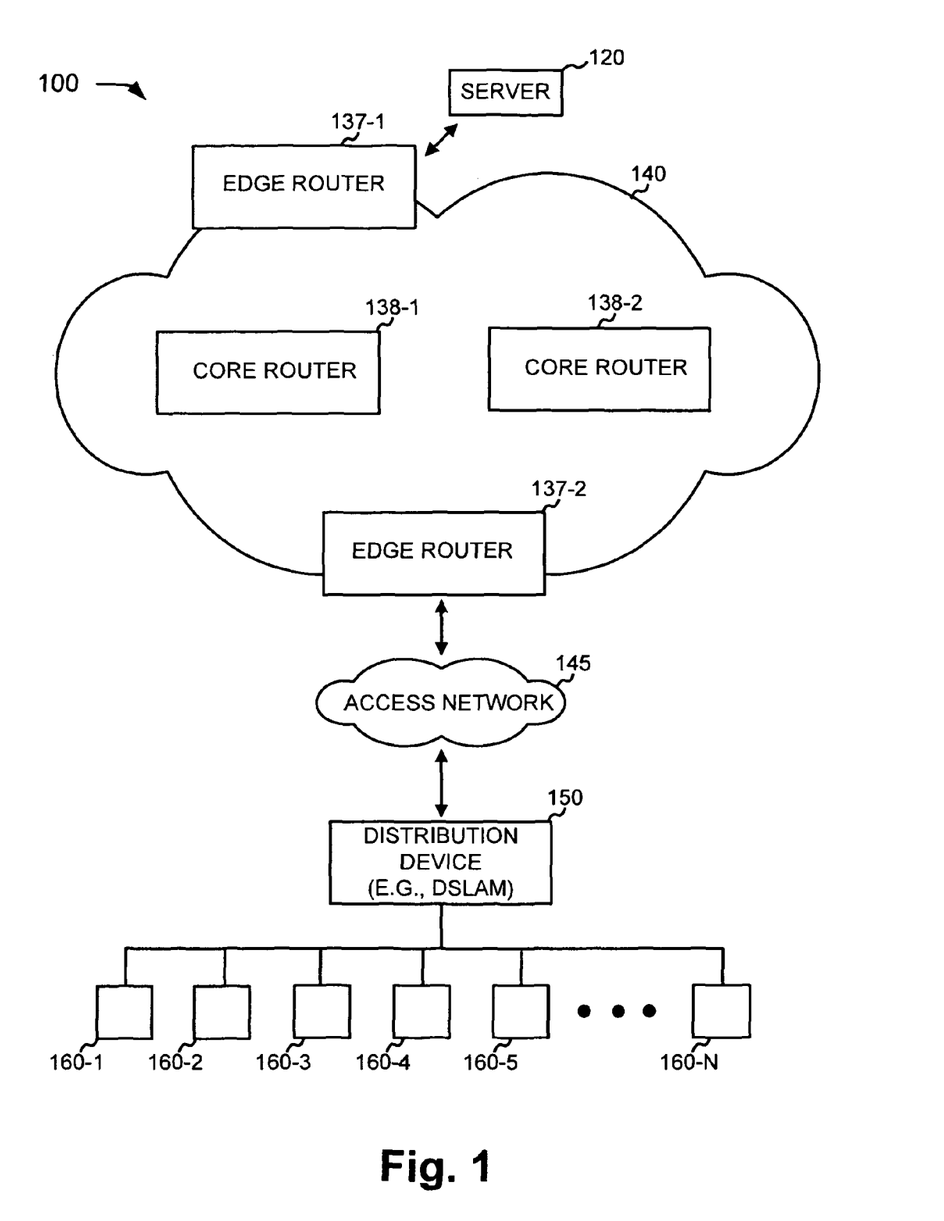
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as a server 120, a first network 140, a second (access) network 145, a distribution device 150, and clients 160-1 through 160-N (collectively referred to herein as clients 160). Server 120 may include one or more computing devices designed to provide information or to otherwise interact with clients 160. Similarly, clients 160 may each include one or more computing devices designed to interact with and obtain content from server 120.

In one possible implementation, clients 160 may receive multicast streams from server 120. For instance, clients 160 may include DSL modems and personal computing or television devices controlled by end-users that subscribe to IPTV services broadcast across first network 140, access network 145, distribution device 150, and to clients 160. Various ones of clients 160 may request various media streams, such as various IPTV channels, at different times. The media streams may be IP packet-based streams.

First network 140 may comprise a wide area network (WAN), such as the Internet, a private WAN, or a combination of the Internet and a private WAN, that is used to transport the multicast streams to clients 160. First network 140 may also transport non-streaming data to clients 160. First network 140 may include a number of routers or other switching devices, such as edge routers 137-1 and 137-2, and core routers 138-1 and 138-2.

Edge routers 137 may generally function to connect devices, such as clients 160 (via distribution device 150), to first network 140. Core routers 138 may generally function to transmit data between other routers within network 140. In addition to simply routing data, edge routers 137 and core routers 138 may support other "value added" functions, such as quality of service (QoS) features and specialized security functions, such as IPsec (IP security) encryption. QoS guarantees are particularly relevant to real-time media streams, such as IPTV. In these situations one or more of core routers 138 and/or edge routers 137 may be configured to satisfy a traffic contract in which a minimum QoS is guaranteed for packets that make up the media stream.

Access network 145 may include a network that connects first network 140 to distribution device 150. Access network 145 may be a collection of devices organized as a traditional network, or, in some implementations, access network 140 may simply be a direct connection between edge router 137-2 and distribution device 150, such as a fiber link between edge router 137-2 and distribution device 150.

Distribution device 150 may be a device that provides clients 160 access to first network 140. In one implementation, distribution device 150 may include a Digital Subscriber Line Access Multiplexer (DSLAM). The DSLAM may function as a part of a digital loop carrier that receives signals from multiple clients 160 and aggregates the signals on a high-speed backbone line using multiplexing techniques. Clients 160 may connect to distribution device 150 through Digital Subscriber Line (DSL) connections. When distribution device 150 is a DSLAM, edge router 137-2 may be referred to as a Broadband Remote Access Server (BRAS).

One of ordinary skill in the art will appreciate that, in practice, system 100 may include other network devices. Additionally, although network 140 is primarily described herein as an IP-based network, network 140 could also be an ATM-based network, a frame relay-based network, or a combination of such networks.

Figure 2:
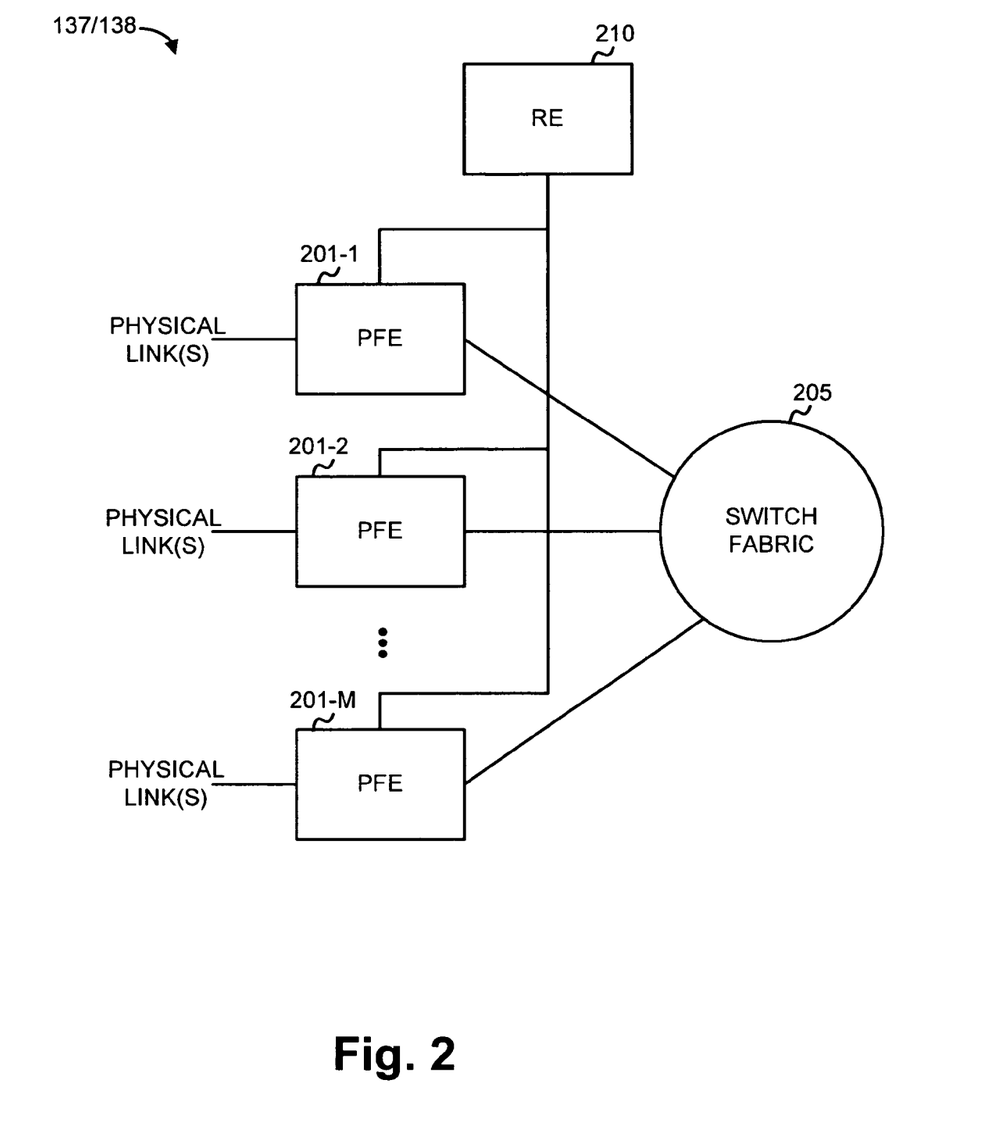
FIG. 2 is a block diagram illustrating a high-level exemplary implementation of one of the edge routers or core routers shown in FIG. 1.

FIG. 2 is a block diagram illustrating a high-level exemplary implementation of one of edge routers 137 or core routers 138, referred to as router 137/138 herein. Router 137/138 may include packet forwarding engines (PFEs) 201-1 through 201-M (collectively referred to as PFEs 201), an internal switch fabric 205, and a routing engine (RE) 210. Router 137/138 receives data from physical links, processes the data to determine destination information, and transmits the data out on a link in accordance with the destination information.

RE 210 may perform high level management functions for router 137/138. For example, RE 210 may communicate with other networks and systems connected to router 137/138 to exchange information regarding network topology. RE 210 may create routing tables based on the network topology information and forward the routing tables to PFEs 201. The PFEs use the routing tables to perform route lookup for incoming data. RE 210 may also perform other general control and monitoring functions for router 137/138.

PFEs 201 may each connect to RE 210 via switch fabric 205. Switch fabric 205 provides internal links between different PFEs 201 and RE 210. In general, PFEs 201 receive data on ports connecting physical links that lead to first network 140 or access network 145. Each physical link could be one of many types of transport media, such as optical fiber or Ethernet cable. The data on the physical link may be formatted according to one of several protocols, such as the synchronous optical network (SONET) standard. PFEs 201 process the received data, determine the correct output port for the data, and transmit the data on the physical link corresponding to the determined output port.

Exemplary Media Stream

Figure 3:
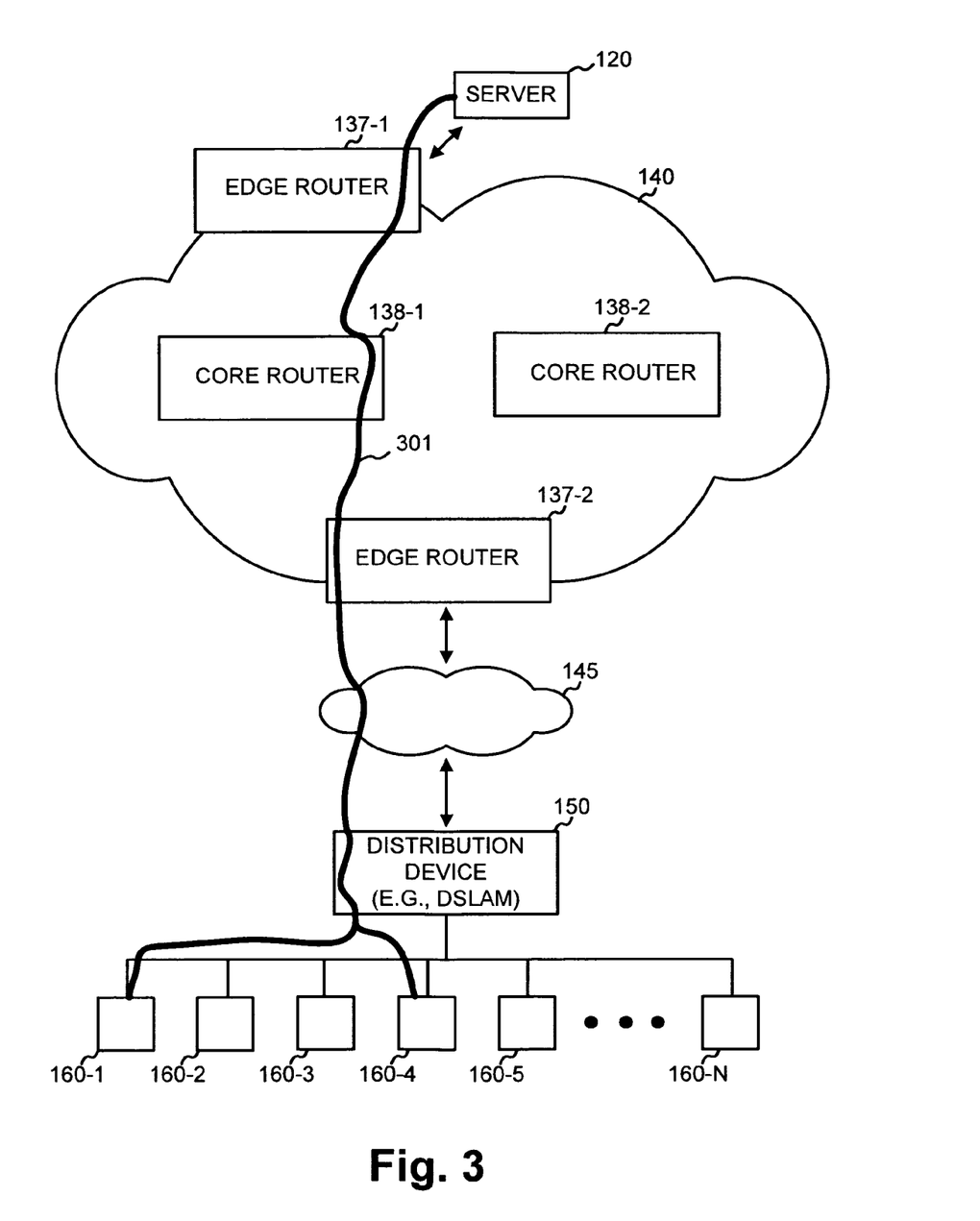
FIG. 3 is a diagram conceptually illustrating operation of the system of FIG. 1 in multicast transmission of an exemplary media stream to multiple clients.

FIG. 3 is a diagram conceptually illustrating operation of system 100 in multicast transmission of an exemplary media stream to multiple clients 160. The system of FIG. 3 is identical to that shown in FIG. 1, except that a multicast media stream 301 is shown between edge router 137-1, core router 138-1, edge router 137-2, access network 145, and distribution device 150. Assume that multicast media stream 301 is a video stream, such as an IPTV stream. Stream 301 may require a fixed bandwidth, such as 1.5 Mbps.

As shown in FIG. 3, two clients, clients 160-1 and 160-4, are requesting stream 301. Through network 140, stream 301 may be transmitted as a single multicast stream. In some existing systems, edge router 137-2 may serve as a replication point in the multicast stream. That is, in these systems, edge router 137-2 may generate a copy of the stream for each client 160 that is currently requesting stream 301 (i.e., clients 160-1 and 160-4). An advantage of this approach is that because edge router 137-2 performs high level routing and policy functions, such as traffic shaping based on QoS policies and potentially other policies, edge router 137-2 is in the best position to incorporate the bandwidth effects of the replication for each client into the traffic shaping decisions relating to each client. A disadvantage of this approach is that access network 145 is required to transmit two copies of the same stream 301, thus wasting bandwidth on access network 145.

In other existing systems, distribution device 150 may serve as the replication point in the multicast stream. An advantage of this approach is that the replication of the stream is delayed up until the final link to the premises of the client (e.g., the DSL connection), thus saving access network 145 bandwidth. A disadvantage of this approach is that by "injecting" traffic at distribution device 150, traffic shaping functionality controlled by edge router 137-2 may be compromised. For example, assume that each client is allotted a single logical connection (e.g., a single virtual connection (VC)) having a fixed maximum bandwidth. Edge router 137-2 may allocate bandwidth for each client based on the assumption that it can allocate traffic up to the maximum bandwidth. However, if distribution device 150 creates additional bandwidth for the client by replicating multicast streams, problems can occur in that the client may be allotted to receive more bandwidth than is permitted by a rate cap or that can be carried on the physical link (e.g., a DSL loop).

Edge Routers 137

Consistent with an aspect of the invention, edge router 137-2 may keep track of multicast replication that is occurring at distribution device 150. Edge router 137-2 may intelligently adjust traffic to clients 160 in anticipation of multicast replication occurring at distribution device 150. In this manner, edge router 137-2 may implement policies, such as QoS based traffic shaping adjustments, concurrently with distribution device 150 performing multicast replication.

Before describing the operation of edge router 137-2 in additional detail, it will be helpful to describe additional components of edge router 137-2. In particular, edge router 137-2 may store information relating to the state of clients 160. This information is illustrated in FIGS. 4 and 5 as tables 400 and 500, which may be maintained by, for example, RE 210 of edge router 137-2.

Figure 4:
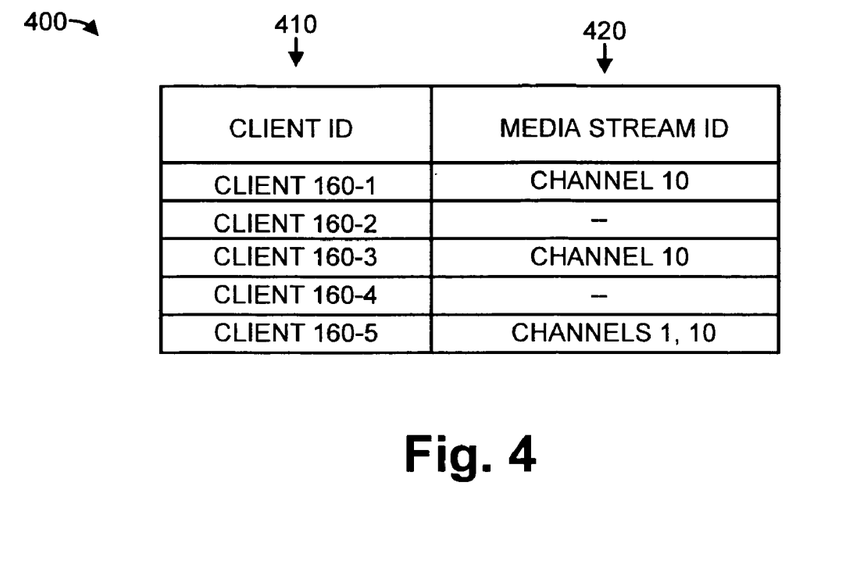
FIG. 4 is an exemplary table illustrating a relationship between clients and corresponding media streams that are currently requested by each client.

FIG. 4 is an exemplary table 400 illustrating a relationship between clients 160 and corresponding media streams that are currently requested by each client. Table 400 may include, for each client, a client identification (ID) column 410 and a media stream ID column 420. Client ID column 410 may include entries that uniquely identify each client 160. Clients 160 may each be associated with a unique ID, such as a client login ID or a Media Access Control (MAC) address associated with the client. This unique ID may be stored as an entry in client ID column 410. Media stream ID column 420 may include an entry that stores, for each client, the media stream currently being requested (if any). In the exemplary table 400, for instance, clients 160-1 and 160-3 are requesting the IPTV channel 10. Clients 160-2 and 160-4 are not requesting any channel. Client 160-5 is requesting channels 1 and 10.

Figure 5:
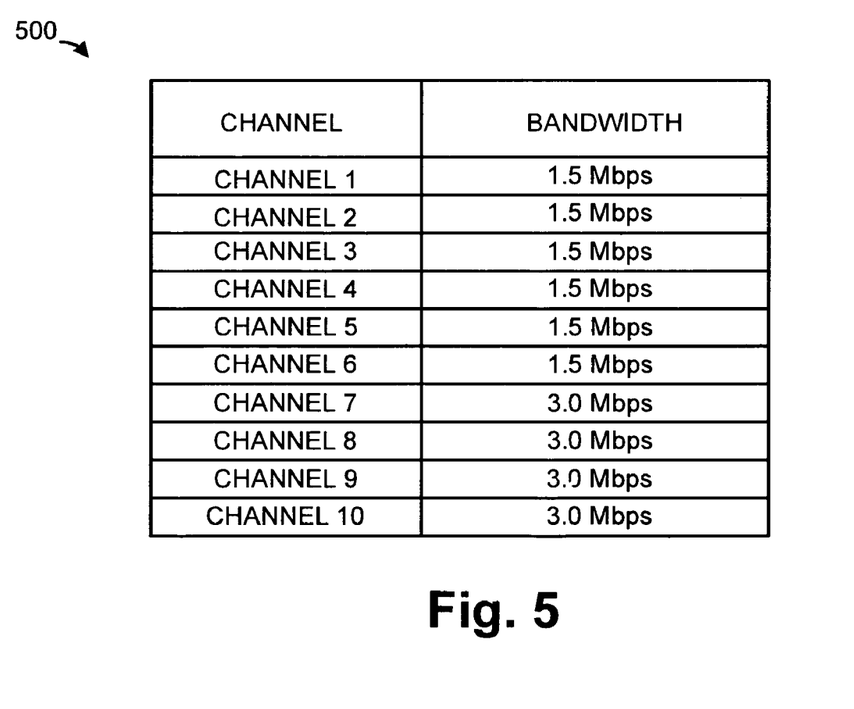
FIG. 5 is an exemplary table illustrating a correspondence between channels that may be requested and the bandwidth required for a channel.

FIG. 5 is an exemplary table 500 illustrating a relationship between the channels that may be requested and the bandwidth required for a channel. Different media streams may use different bandwidths. For instance, for IPTV, a standard definition television signal (SDTV) may require approximately 1.5 Mbps while a high definition signal may require approximately 3.0 Mbps. Other streams, such a voice, may require different bandwidths. In the exemplary table 500, ten different channels are shown. Channels 1-6 are SDTV streams that require 1.5 Mpbs and channels 7-10 are HDTV streams that require 3.0 Mbps.

In one implementation, table 500 may be manually configured by an administrator. That is, an administrator may manually set the bandwidth required by each possible media stream. In another implementation, described in more detail below, the bandwidth of the media streams may be monitored by edge router 137-2 and dynamically and automatically adjusted in table 500.

Although two separate tables 400 and 500 were described above, one of ordinary skill in the art will recognize that tables 400 and 500 could be implemented as other data structures.

Figure 6:
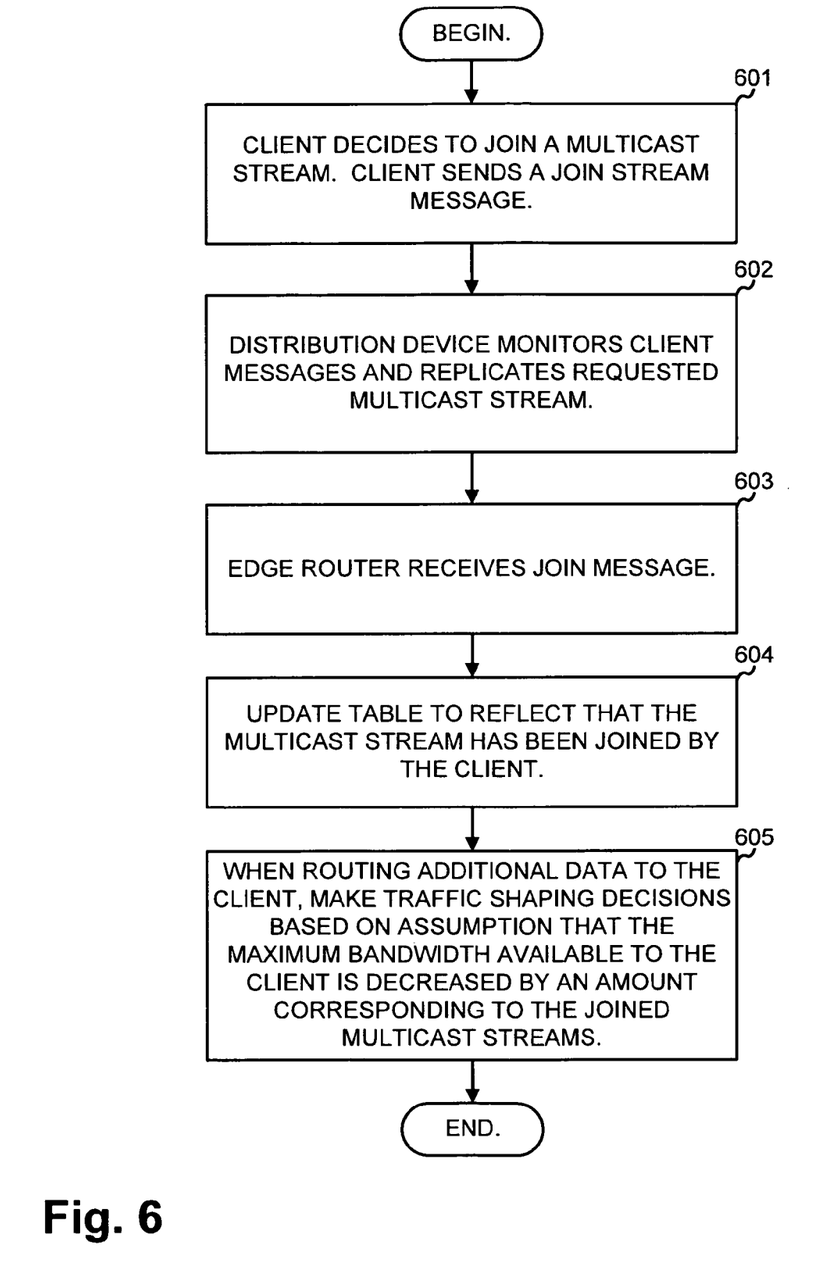
FIG. 6 is a flow chart illustrating exemplary operations when a client joins a multicast traffic stream.

FIG. 6 is a flow chart illustrating exemplary operations when a client joins a multicast traffic stream. Edge router 137-2 may initially start in a state in which it is routing non-multicast data to clients 160. For example, end-users at clients 160 may be generally browsing the web or performing other activities in which each client receives data via unicast transmissions.

At some point, one of clients 160, such as client 160-1, may join a multicast stream (act 601). The user at client 160-1 may, for example, choose to view an IPTV channel or another multicast stream. Client 160-1 transmits a message to edge router 137-2 that indicates that the client is interested in joining the chosen multicast stream (act 601). In one implementation, the message may be an Internet Group Management Protocol (IGMP) "join" message.

IGMP is a known communications protocol used to manage the membership of IP multicast groups. IGMP is used by IP hosts and adjacent multicast routers to establish multicast group memberships. An IGMP join message allows the message sender to specify that it would like to join a particular multicast transmission.

The IGMP join message may pass though distribution device 150 on its way to edge router 137-2. Distribution device 150 monitors messages from client 160-1 and notes the multicast streams requested by client 160-1 (act 602). Distribution device 150 may then begin to replicate the requested multicast stream, if necessary, and transmit it to the requesting client (act 602).

Edge router 137-2 may also receive the join message, such as by receiving the join message forwarded by distribution device 150 (act 603). In response, logic in edge router 137-2 may update table 400 to reflect the multicast stream that is being joined (act 604).

When routing additional data to client 160-1, logic in edge router 137-2 may make routing decisions based on the assumption that the maximum bandwidth available to client 160-1 is decremented by an amount corresponding to the bandwidth of the multicast streams that the client is currently receiving, as determined from tables 400 and 500 (act 605). In other words, edge router 137-2 may perform traffic shaping functions for each client using an assumed bandwidth that is an aggregate of the multicast streams being subscribed-to by the client and based on the total bandwidth of the unicast traffic to the client. Accordingly, even though the multicast streams may, from the point of view of edge router 137-2, be destined for distribution device 150, edge router 137-2 still takes the bandwidth of the multicast streams associated with client 160-1 into account when performing traffic shaping functions for client 160-1. This can be particularly useful when client 160-1 is allotted a single logical connection that has a predefined maximum bandwidth cap or physical capacity limitation.

Figure 7:
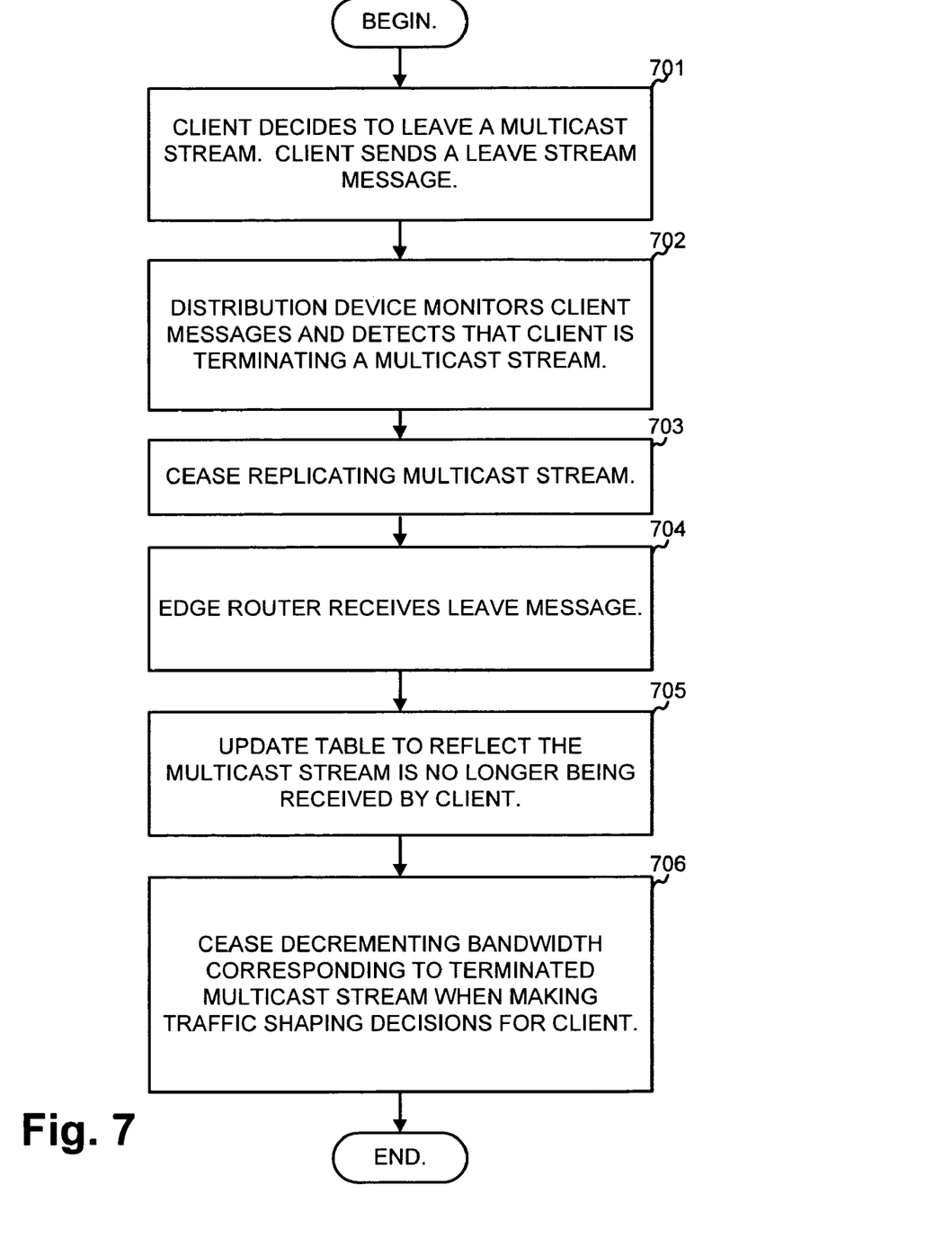
FIG. 7 is a flow chart illustrating exemplary operations when a client leaves a multicast traffic stream.

FIG. 7 is a flow chart illustrating exemplary operations when a client leaves a multicast traffic stream. When leaving a multicast stream, client 160-1 may transmit a message to edge router 137-2 that indicates that the client is interested in leaving the multicast stream (act 701). The message may be, for example, an IGMP "leave" message. Distribution device 150 monitors messages from client 160-1 and will note that the client is terminating a multicast stream (act 702). Distribution device 150 may then cease replicating the multicast stream to the client (act 703).

Edge router 137-2 also may also receive the leave message from client 160-1 (via distribution device 150) (act 704). In response, edge router 137-2 may update table 400 to reflect that the multicast stream is no longer being received by the client (act 705). When making additional traffic shaping decisions regarding client 160-1, edge router 137-2 may stop decrementing the maximum bandwidth available to the client for the multicast stream that the client has stopped receiving (act 706).

As an example of the operations shown in FIGS. 6 and 7, assume that clients 160 connect to distribution device 150 via DSL connections that are one single logical connection. Further, assume that the clients are pre-assigned a maximum bandwidth of 3 Mbps in edge router 137-2. An end-user associated with client 160-1 decides to watch IPTV channel 10. Client 160-1 sends an IGMP join message to distribution device 150, which then begins to stream channel 10 to client 160-1. Additionally, edge router 137-2 receives the IGMP join message (or a message derived from the IGMP join message) and updates its internal data structures (e.g., table 400) to indicate that the user is currently receiving a 1.5 Mbps traffic stream that is being replicated at distribution device 150. In response, edge router 137-2 may adjust its QoS shaping rate by 1.5 Mbps to reflect that the maximum additional bandwidth available to client 160-1 is reduced to 1.5 Mbps (3 Mbps-1.5 Mbps). Further traffic shaping decisions may then be made based on this lowered maximum rate. For example, assume client 160-1 simultaneously requests a large file download. Edge router 137-2 may cap the bandwidth dedicated to the file download at 1.5 Mbps instead of the normal 3 Mbps.

Dynamic Adjustment of the Bandwidth Required for Multicast Streams

As mentioned previously, when adjusting the maximum available bandwidth for a client, edge router 137-2 may make the adjustment based on the bandwidth required for a requested media stream, as indicated in table 500. Consistent with an aspect of the invention, the bandwidth requirements of each of the streams may be automatically measured and tabulated by edge router 137-2. By automatically updating table 500, edge router 137-2 may more quickly adjust to changes in a stream that affect the bandwidth of the stream, such as encoding rate changes, channel lineup changes, etc.

In operation, edge router 137-2 may occasionally or periodically monitor each of the potential media streams to measure the bandwidth associated with each of the streams. That is, edge router 137-2 may measure the amount of multicast traffic on a per multicast destination basis. When edge router 137-2 detects a change in the measured bandwidth of a stream, table 500 may be updated.

Figure 8:
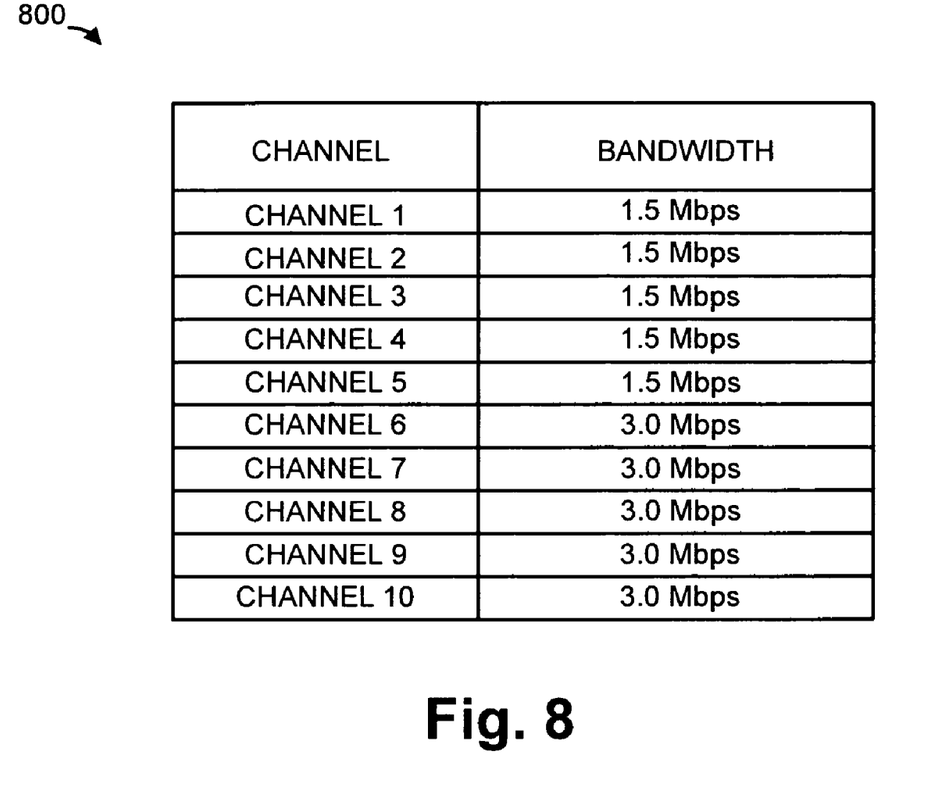
FIG. 8 is an exemplary table illustrating a correspondence between the channels that may be requested and the bandwidth required for a channel.

FIG. 8 is an exemplary table 800 illustrating a correspondence between the channels that may be requested and the bandwidth required for a channel. Table 800 is identical to table 500, except that one of the stream bandwidths has been changed. For example, assume that edge router 137-2 determines that channel 6 has changed from a 1.5 Mbps channel to a 3.0 Mbps channel. This may be due to the channel changing from a standard definition television channel to a high definition television channel. Edge router 137-2 may accordingly update table 500 to obtain table 800.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of acts have been described with regard to FIGS. 6 and 7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device for routing data to a plurality of clients comprising:
   a processor to connect to the plurality of clients via a second device;
   a memory to store a first data structure to store information representing which of a plurality of multicast media streams are being requested by the plurality of client, where the memory is to store a second data structure to store a bandwidth required by each of the plurality of multicast media streams, and where the memory is further to store routing logic, which when executed by the processor, implements network traffic shaping, for one client of the plurality of clients, based on an assumption that a maximum bandwidth available to the one client is decreased by an amount corresponding to the required bandwidth of one or more of the plurality of multicast media streams that are being requested by the one client, and where the routing logic implements the network traffic shaping concurrently with, and based on, the second device performing multicast replication of the one or more of the plurality of multicast media streams that are being requested by the one client.

2. The device of claim 1, where the second device is a Digital Subscriber Line Access Multiplexer (DSLAM).

3. The device of claim 1, where the first data structure is updated to reflect an addition of a multicast media stream requested by the client based on reception of an Internet Group Management Protocol (IGMP) join message.

4. The device of claim 1, where the first data structure is updated to reflect removal of a multicast media stream requested by the client based on reception of an Internet Group Management Protocol (IGMP) leave message.

5. The device of claim 1, where:
   the memory further is to store logic, which when executed by the processor, is to monitor the plurality of multicast media streams to detect changes in bandwidth of one of the plurality of multicast media streams.

6. The device of claim 1, where the plurality of multicast media streams include IP television (IPTV) channels.

7. The device of claim 1, where the multicast streams include IP television (IPTV) channels.

8. The device of claim 5, where the logic to monitor the plurality of multicast media streams updates the second data structure in response to detecting a change in the bandwidth of the one of the plurality of multicast media streams.

9. A device for routing data to a plurality of subscribers, comprising:
a processor; and
a memory to store logic, which when executed by the processor, processes network traffic that includes a plurality of multicast streams by implementing network traffic shaping, for each of a plurality of subscribers, based on a bandwidth of each of the multicast streams that is being subscribed to by a subscriber and a bandwidth of unicast traffic to the subscriber, where the memory is further to store logic, which when executed by the processor, transmits the processed network traffic to a distribution device that connects each of the plurality of subscribers to corresponding ones of the plurality of multicast streams, and when the plurality of subscribers are simultaneously subscribing to a same multicast stream, replicates the same multicast stream and transmits the same multicast stream to the plurality of subscribers,
where the logic implements the network traffic shaping concurrently with the distribution device replicating the same multicast stream, and where the network traffic shaping is based on the replicating the same multicast stream.

10. The device of claim 9, where the distribution device includes a Digital Subscriber Line Access Multiplexer (DSLAM).

11. The device of claim 9, where the device is connected to the distribution device via an access network.

12. The device of claim 9, where the memory further stores a first data structure to store information representing which of the plurality of multicast streams is being requested by each of the plurality of subscribers.

13. The device of claim 10, where each of the plurality of subscribers connects to the DSLAM via the single logical connection.

14. The device of claim 12, where the first data structure is updated to reflect an addition of a multicast media stream requested by one of the plurality of subscribers based on reception of an Internet Group Management Protocol (IGMP) join message.

15. The device of claim 12, where the first data structure is updated to reflect removal of a multicast media stream requested by one of the plurality of subscribers based on reception of an Internet Group Management Protocol (IGMP) leave message.

16. The device of claim 12, where
the memory further stores a second data structure to store a bandwidth required by each of the multicast media streams, the second data structure being used by the logic to process the network traffic when implementing traffic shaping policies.

17. The device of claim 16, where the second data structure is dynamically updated based on a measured bandwidth of the multicast streams.

18. A method comprising:
receiving a message from a client device, at a Broadband Remote Access Server (BRAS), requesting that the client device join a multicast stream, where replication of traffic on the multicast stream occurs at a Digital Subscriber Line Access Multiplexer (DSLAM) that connects the client device to the BRAS;
determining, by the BRAS, a bandwidth requirement of the multicast stream based on the message from the client device;
routing, by the BRAS, unicast network traffic to the client device; and
implementing, by the BRAS, network traffic shaping, of the unicast traffic, concurrently with, and based on, the replication, by the DSLAM, of traffic of the multicast stream, where the traffic shaping is based on an assumption that a maximum bandwidth available to the client device is decreased by an amount corresponding to the bandwidth requirement of the multicast stream that is being requested by the client device.

19. The method of claim 18, where the client device connects to the DSLAM using a digital subscriber line (DSL) connection.

20. The method of claim 18, where the message includes an Internet Group Management Protocol (IGMP) join message.

21. The method of claim 18, where the multicast stream includes IP television (IPTV) channels.

22. The method of claim 18, where determining the bandwidth requirement of the multicast stream includes looking up the bandwidth requirement in a table that stores correspondences between a plurality of multicast streams and bandwidths associated with each of the plurality of multicast streams.

23. The method of claim 20, further comprising:
receiving an Internet Group Management Protocol (IGMP) leave message from the client device indicating that the client device requests to leave the multicast stream.

24. The method of claim 22, further comprising:
monitoring the plurality of multicast streams and updating the table to reflect changes in the bandwidths of the multicast streams.

25. A device comprising:
a processor; and
a memory to store first logic, which when implemented by the processor, forwards network traffic, in multicast streams, to a distribution device that connects subscribers, by a single logical connection, to the multicast streams, where the memory is to store a data structure to store a bandwidth required by each of the multicast streams, where the memory is to store second logic, which when implemented by the processor, monitors the bandwidth required by each of the multicast streams and updates the data structure when the bandwidth required by one the multicast streams changes; and where the memory to further store third logic, which when implemented by the processor, receives the network traffic and transmits the network traffic to the first logic, the third logic performing Quality of Service (QoS) functions, for each of the subscribers, concurrent with, and based on the distribution device replicating a same multicast stream that is being subscribed to by one or more of the subscribers, and an aggregate bandwidth of unicast traffic to one or more of the subscribers.

26. The device of claim 25, where the multicast stream includes IP television (IPTV) stream.

27. The device of claim 25, where each of the subscribers connects to the device via a Digital Subscriber Line Access Multiplexer (DSLAM) over the single logical connection.

* * * * *